United States Patent [19]

Walsh et al.

[11] 3,821,122

[45] June 28, 1974

[54] BLOCK COPOLYMER COMPOSITIONS HAVING IMPROVED CLOUD POINTS

[75] Inventors: John J. Walsh; Carl J. Litteral, both of Marietta, Ohio

[73] Assignee: Union Carbide Corporation, New York, N.Y.

[22] Filed: Mar. 10, 1972

[21] Appl. No.: 233,723

[52] U.S. Cl.............. 252/353, 252/307, 252/363.5, 260/2.5 AH
[51] Int. Cl. ........................ B01f 17/12, B01f 17/54
[58] Field of Search...... 252/351, 353; 260/2.5 AM, 260/2.5 AH

[56] References Cited
UNITED STATES PATENTS

| | | | |
|---|---|---|---|
| 3,562,786 | 2/1971 | Bailey et al. | 252/524 |
| 3,594,334 | 7/1971 | Marlin | 260/2.5 AM |
| 3,669,913 | 6/1972 | Morehouse | 252/182 X |

*Primary Examiner*—Richard D. Lovering
*Attorney, Agent, or Firm*—Eugene C. Trautlein

[57] ABSTRACT

This application relates to compositions containing a siloxane-polyoxyalkylene block copolymer and an alkali metal salt of an organic sulfonic acid containing from 10 to 35 carbon atoms. The salts markedly increase the cloud points of the block copolymers. The compositions are useful in forming aqueous premixtures that can be employed in producing polyurethane foams. The block copolymer of the compositions functions as a foam stabilizer.

3 Claims, No Drawings

BLOCK COPOLYMER COMPOSITIONS HAVING IMPROVED CLOUD POINTS

Siloxane-polyoxyalkylene block copolymers wherein the blocks are linked by silicon to oxygen to carbon linkages are known materials used commercially in producing polyurethane foams. Water-soluble siloxane-polyoxyalkylene block copolymers are characterized by inverse water solubility. That is, the block copolymers are soluble in water at relatively low temperatures but become insoluble at higher temperatures. When the temperature of such an aqueous solution is raised to the point where the block copolymer becomes insoluble, the block copolymer-water mixture becomes cloudy. Hence, this temperature is called the "cloud point" of the block copolymer. In the commercial production of polyurethane foams, it has been found desirable at times to form premixtures containing the siloxane-polyoxyalkylene block copolymer foam stabilizer and the water used as a blowing agent. In the case of block copolymers having low cloud points, such premixtures having the undesirable property of becoming non-homogeneous (cloudy) even at moderately elevated temperatures (e.g., during the summer months).

It is an object of this invention to provide siloxane-polyoxyalkylene block copolymer compositions having improved cloud points.

Other objects of this invention will be apparent from the following description thereof.

This invention provides a composition consisting essentially of: (A) a major amount of a water-soluble siloxane-polyoxyalkylene block copolymer consisting essentially of at least one siloxane block and at least one polyoxyalkylene block linked by a silicon to oxygen to carbon linkage, and (B) a minor amount of an alkali metal salt of an organic sulfonic acid containing from 10 to 35 carbon atoms, said salt being present in the composition in an amount sufficient to raise the cloud point of the block copolymer. The siloxane-polyoxyalkylene block copolymers useful in the compositions of this invention consist essentially of at least one siloxane block and at least one oxyalkylene block linked by a silicon to oxygen to carbon linkage. The preferred block copolymers present in such compositions consist of at least one siloxane block represented by the average formula:

(1)

and at least one polyoxyalkylene block represented by the average formula:

(2)

wherein R represents a monovalent hydrocarbon group, $a$ and $c$ each have a value of at least 0, $b$ has a value of at least 5, (preferably from 10 to 75), R'' is hydrogen or R, $m$ has a value of at least 2 and $n$ has a value of at least 5. Preferably, $a$ has a value from 0 to 4 inclusive, $b$ has a value from 10 to 75 inclusive, $c$ has a value from 1 to 5 inclusive, R is a methyl group, R'' is an alkyl group having from one to four carbon atoms inclusive, $(OC_mH_{2m})_n$ represents polyoxyethylene or poly(oxyethylene-oxypropylene), and $n$ has a value from 10 to 40 inclusive. The block copolymers employed in the compositions of this invention preferably contain from 15 to 30 parts by weight of the siloxane blocks and from 70 to 85 parts by weight of the polyoxyalkylene blocks per 100 parts by weight of the block copolymers. The block copolymers are water-soluble, preferably to the extent of at least 1 part by weight of the block copolymers per 99 parts by weight of water at 25°C.

Typical of the monovalent hydrocarbon groups represented by R in formula (1) are the linear alkyl groups (for example, the methyl, ethyl, n-propyl, isopropyl, n-butyl, sec-butyl, isobutyl, t-butyl, n-octyl, decyl, dodecyl groups), the cycloalkyl groups (for example, the cyclopropyl, cyclobutyl, cyclopentyl, cyclohexyl, cycloheptyl groups), the aryl groups (for example, the phenyl, naphthyl, phenathrenyl, antharacenyl groups), the aralkyl groups (for example, the benzyl, 2-phenylethyl, 2-phenylpropyl, cumyl groups), the alkaryl groups (for example, the tolyl, t-butylphenyl, cyclohexylphenyl groups), the linear alkenyl groups (e.g., the vinyl and allyl groups) and the cyclic alkenyl groups (e.g., the cyclopentynyl and the cyclohexenyl groups).

In the above formulas, the symbols representing the types and groups need not have the same meaning at each occurrence throughout the composition. For example, in a given siloxane block represented by formula (1) above, some of the $R_2SiO$ groups can be dimethylsiloxane groups ($Me_2SiO$) while other of such groups can be beta-phenylethyl(methyl)siloxane groups ($C_6H_5CH_2CH_2SiMeO$) and in a given polyoxyalkylene block represented by formula (2) above, some of the $OC_mH_{2m}$ groups can be oxyethylene groups while other of such groups can be oxypropylene groups.

The term "block copolymer" is used herein to denote a material wherein at least one section ("block") of the molecule is composed of recurring monomeric units of one type and at least one other section ("block") of the molecule is composed of recurring monomeric units of a different type. The different sections or blocks in the molecule can be arranged in any configuration [e.g., AB, ABA, branched, pendant, cyclic or $(AB)_n$] as illustrated by the structures disclosed in U.S. Pat. Nos. 2,834,748; 2,917,480; and 3,356,758. Thus the term "block copolymers" as used herein includes graft copolymers. The block copolymers in the compositions of this invention can be discrete chemical compounds. Usually, however, the block copolymers are mixtures of various discrete block copolymeric species. The block copolymers are usually mixtures due, at least in part, to the fact that the siloxane and polyoxyalkylene reactants used to produce the block copolymers are themselves usually mixtures.

The salts employed in the compositions of this invention are alkali metal salts of organic sulfonic acids containing from 10 to 35 carbon atoms. Typical of such salts are the sodium and potassium salts of haloalkylsulfonic acids, arylsulfonic acids and alkarylsulfonic acids (e.g., dodecylbenzene sulfonic acid, butylnaphthalene sulfonic acid, docosane benzene sulfonic acid, triacontane benzene sulfonic acid and tridecylbenzene sulfonic acid).

The relative amounts of the block copolymer and the salt present in the compositions of this invention are not narrowly critical provided that the salt is present in an amount sufficient to raise the cloud point of the block copolymer (preferably by at least 5°C).

The compositions of this invention can be produced by a process which comprises (I) forming at at least partially compatible reaction mixture containing: (a) a siloxane reactant having at least one silicon-bonded alkoxy group, (b) a polyoxyalkylene polymer reactant having at least one alcoholic hydroxyl group, and (c) an acid salt catalyst formed from a tertiary amine and an organic sulfonic acid containing from 10 to 35 carbon atoms; (II) maintaining the reaction mixture at a temperature at which (a) and (b) react to form the siloxane-polyoxyalkylene block copolymer and an alkanol byproduct while removing the alkanol byproduct from the reaction mixture; and (III) neutralizing the acid salt catalyst by reacting the catalyst with an alkali metal bicarbonate to convert the catalyst to an alkali metal salt of the organic sulfonic acid. The crude product of the above process can be filtered to remove any insoluble salts and the filtrate is a composition of this invention in which the alkali metal salt of the organic sulfonic acid has been formed in situ in the block copolymer. The formation of the salt in situ circumvents the insolubility problems encountered in separately producing the salt and then blending it with the block copolymer. Reactants and reaction conditions suitable for use in the above-described process for producing the compositions of this invention are disclosed and claimed in copending U.S. Pat. application U.S. Ser. No. 233,732, filed concurrently herewith in the name of Carl J. Litteral, entitled "Process for Producing Siloxane-Polyoxyalkylene Block Copolymers."

The compositions of this invention can be employed in the production of polyurethane foams. In the production of such foams, the block copolymer functions as a foam stabilizer as disclosed in U.S. Pat. Nos. 3,194,770 and 3,507,815. In view of the relatively high cloud points of the compositions, the compositions are particularly adapted to the formation of aqueous premixtures that can be employed in producing polyurethane foams. When such aqueous premixtures are so employed, the block copolymer functions as a foam stabilizer and the water functions as a blowing agent.

The following Examples illustrate the present invention. In the following Examples the terms, abbreviations and symbols used have the indicated meanings.

| Definitions | |
| --- | --- |
| * | An asterisk (*) beside the number of an Example appearing below indicates that the Example is presented for purpose of comparison and does not illustrate the present invention. |
| % | per cent by weight |
| Bu | butyl |
| C | Centigrade |
| conc. | concentration |
| cstks. or cs. | centistokes at 25°C. |
| g. | grams |
| Hg. | mercury |
| in. | inch |
| Me | methyl |
| ml. | milliliter |
| mm. | millimeters |
| Polyol I | A polyol produced from glycerol and a mixture of 86 weight per cent propylene oxide and 14 weight per cent ethylene oxide. Polyol I has a hydroxyl number of 46. |
| Polyol II | A polyol produced from glycerol and propylene oxide. Polyol II has a hydroxyl number of 56. |

-Continued

| Definitions | |
| --- | --- |
| TDI | A mixture of 80 weight-% 2,4-tolylene diisocyanate and 20 weight-% 2,6-tolylene diisocyanate. |
| visc. | viscosity |

Cloud Point Measurement

In the Examples appearing below, the cloud points of the neutralized products were measured as follows: A clear aqueous solution was formed at about 25°C containing one gram of the neutralized product and 99 grams of distilled water. The aqueous solution was placed in a 150 milliliter glass beaker equipped with a stirrer and with a thermometer. The thermometer was mounted in the center of the beaker so that the lower portion thereof was immersed in the solution and was close to, but not in contact with, the bottom of the beaker. The solution was slowly heated. The temperature at which the solution became so cloudy that the thermometer could no longer be seen was taken as the cloud point of the product.

Polyurethane Foam Properties

The formulations and procedures for the polyurethane foam tests referred to in the Examples are shown below.

TESTS A AND B

| Material | Formulation | Parts by Weight |
| --- | --- | --- |
| Polyol I | | 100.0 |
| Distilled Water | | 4.85 |
| Dimethylethanol Amine | | 0.35 |
| CCl$_3$F | | 15.0 |
| Stannous Octoate | | 0.3 |
| TDI | | 56.9 |
| Block Copolymer Composition: | Test A | 0.90 |
| | Test B | 0.50 |

The foams were produced by adding the copolymer to Polyol I in a 1,000 ml. container, mixing with a spatula, adding a mixture of the water and amine to the container, adding CCl$_3$F to the container, mixing with a drill press for 15 seconds, adding the stannous octoate, mixing for 8 seconds with a drill press adding the TDI, mixing with a drill press for 7 seconds, pouring into a mold and curing for 15 minutes at 135°C. Prior to the cure the temperature of the materials was maintained at no higher than 25°C. In view of the differences in the amounts of block copolymer used, Test B is a more rigorous test than Test A for evaluating the copolymers as polyurethane foam stabilizers.

TEST C

| Material | Formulation | Parts by Weight |
| --- | --- | --- |
| Polyol II | | 100.0 |
| Distilled Water | | 5.0 |
| Triethylenediamine | | 0.1 |
| N-ethylmorpholine | | 0.2 |
| Stannous Octoate | | 0.325 |
| CCl$_3$F | | 3.0 |
| TDI | | 56.9 |
| Block Copolymer Composition: | | 0.9 |

The foams were prepared by: adding the copolymer to Polyol II in a 1,000 ml. container, mixing with a spatula, adding a mixture of the water and amines to the container, adding the CCl₃F to the container, mixing with a drill press for 15 seconds, adding the stannous octoate, mixing with a drill press for 8 seconds, adding the TDI, mixing with a drill press for 7 seconds, pouring into a mold and curing for 15 minutes at 135°C.

Foam Evaluation

The following terms are used in the Examples in connection with the above-described polyurethane foam tests:

Foam Rise

The Foam Rise is the height of the cured polyurethane foam in inches. A difference in the Foam Rise values of two foams of at least 0.3 inches is considered a significant difference.

Potency

The potency of a siloxane-polyoxyalkylene block copolymer composition denotes the effectiveness of the composition as a polyurethane foam stabilizer. At a given concentration, a more potent composition will result in a polyurethane foam having a higher Foam Rise value.

Cells Per Inch

This denotes the number of cells in the polyurethane foam per linear inch of the foam. The greater the Cells Per Inch value, the finer the cell structure of the foam.

Air Flow

This is the rate of flow of air in standard cubic feet per minute at 0.5 inches water positive pressure through a one inch thick block of foam having a cross section of two inches by two inches. The Air Flow value is related to the porosity of the foam. The higher the Air Flow value, the more porous the foam.

Failed

This denotes that the composition tested was not a polyurethane foam stabilizer in that either no foam was produced or a foam was produced but collapsed.

The polyurethane foams produced as described in the following Examples were generally equivalent in terms of their Cells Per Inch and their Air Flow values (i.e., the foams were generally equivalent with regard to their fineness of cell structure and porosity).

EXAMPLES I through XII

A series of polyoxyalkylene ether-polydimethylsiloxane block copolymers were prepared in accordance with the following procedure. A monohydroxy polyoxyalkylene ether having the average formula:

$$HO(C_3H_6O)_{18}(C_2H_4O)_{24}C_4H_9$$

(120 grams), toluene (80 grams) and catalyst(s) (0.0016 gram moles) were charged to a one-liter agitated, glass reaction vessel fitted with a distillation column and still head. [The above-mentioned polyoxyalkylene ether reactant was used in all the Examples and had the average formula shown above. It was produced by mixing 78 weight percent $HO(C_3H_6O)_{16}(C_2H_4O)_{21}C_4H_9$ and 22 weight percent $HO(C_3H_6O)_{24}(C_2H_4O)_{32}C_4H_9$.] The solution was heated to reflux and a small amount of contained water in the ether was removed at the still head as a toluene water azeotrope. An ethoxy endblocked polydimethylsiloxane fluid having the average formula:

$$(MeSiO_{1.5})_{1.2}(Me_2SiO)_{18}(C_2H_5O_{0.5})_3$$

(29.5 grams) and toluene (8.7 grams) were added to the solution in the reaction vessel and the resulting mixture was heated to reflux. Ethanol was concentrated in the still head that was maintained at partial reflux. The reaction was continued until foam appeared on the surface of the reaction mixture which indicated that the transesterification reaction had gone at least partially to completion. After heating an additional 30 minutes, the reaction mixture was neutralized with sodium bicarbonate and the toluene removed by distillation. The residue was then filtered to remove the salt. The resulting homogeneous liquid residues were characterized by cloud point, viscosity at 25°C. and ability to stabilize polyurethane foam in one or more of the tests described above. A comparison of the properties of the products and properties of the resulting polyurethane foams is shown in the attached Tables 1 and 2. As noted above, an asterisk (*) beside the number of an Example denotes that the Example is presented for purpose of comparison and does not illustrate the present invention.

TABLE 1

| Example | Catalyst(s) (grams) | Cloud Point (°C) | Viscosity at 25°C (cstks.) |
|---|---|---|---|
| I* | CF₃COOH (0.17) & CH₃COOK (0.16) | 40 | 1310 |
| II* | (CH₃)₃C₅H₂NH⁺CH₃C₆H₄SO₃⁻ (.062) | 40 | 1170 |
| III* | 1,3,5-(CH₃)₃C₅H₂NH⁺CF₃SO₃⁻ (0.45) | 39 | 1320 |
| IV | 1,3,5-(CH₃)₃C₅H₂NH⁺C₁₂H₂₅C₆H₄SO₃⁻ (0.73) | 42 | 1020 |
| V | (C₂H₅)₂NC₆H₅H⁺C₁₂H₂₅C₆H₄SO₃⁻ (0.79) | >90 | 1250 |
| VI* | C₅H₅NH⁺CF₃SO₃⁻ (0.42) | 40 | 1180 |
| VII* | C₅H₅NH⁺CH₃C₆H₄SO₃⁻ (0.59) | 40 | 1160 |
| VIII* | (C₂H₅)₂NC₆H₅H⁺CF₃SO₃⁻ (0.51) | 40 | 1460 |

TABLE 1—Continued

| Example | Catalyst(s) (grams) | Product Cloud Point (°C) | Viscosity at 25°C (cstks.) |
|---|---|---|---|
| IX | $C_3H_7NH^+C_{12}H_{25}C_6H_4SO_3^-$ (0.75) | >90 | 1270 |
| X* | $C_3H_7NH^+HCF_3SO_3^-$ (0.47) | 39 | 1360 |
| XI* | $C_3H_7NH^+CH_3C_6H_4SO_3^-$ (0.64) | 39 | 1120 |
| XII* | $C_5H_5NH^+SO_4H^+$ | 40 | 1205 |

TABLE 2

| Product of Example | Polyurethane Foam Properties | | | | | | | | |
|---|---|---|---|---|---|---|---|---|---|
| | Test A | | | Test B | | | Test C | | |
| | Foam Rise (in.) | Cells Per Inch | Air Flow | Foam Rise (in.) | Cells Per Inch | Air Flow | Foam Rise (in.) | Cells Per Inch | Air Flow |
| I* | 12.2 | 34 | 5.9 | 11.1 | 32 | 6.3 | 11.3 | 36 | 2.4 |
| II* | 12.1 | 34 | 6.2 | 11.2 | 32 | 5.8 | 11.3 | 34 | 1.8 |
| III* | 12.2 | 34 | 5.7 | 11.3 | 32 | 6.0 | 11.1 | 34 | 1.8 |
| IV | 12.3 | 34 | 6.4 | 11.4 | 32 | 5.7 | 11.2 | 26 | 0.8 |
| V | 12.6 | 34 | 5.6 | 11.4 | 40 | 2.5 | 11.7 | 30 | 5.0 |
| VI* | 12.2 | 34 | 5.6 | 11.5 | 32 | 5.9 | 11.1 | 32 | 1.6 |
| VII* | 12.6 | 34 | 5.4 | 11.4 | 38 | 2.7 | 11.7 | 30 | 4.8 |
| VIII* | 12.2 | 34 | 6.3 | 11.6 | 32 | 5.7 | 11.5 | 28 | 1.1 |
| IX | 12.3 | 34 | 6.1 | 11.2 | 28 | 5.2 | 11.4 | 38 | 2.4 |
| X* | 12.4 | 34 | 6.2 | 11.7 | 32 | 6.0 | 11.1 | 30 | 1.6 |
| XI* | — | Failed | — | — | Not Run | — | — | Not Run | — |
| XII* | 12.2 | 34 | 5.0 | — | Not Run | — | 11.4 | 38 | 2.5 |

The data in Tables 1 and 2 show that the compositions of the present invention (the products of Examples IV, V and IX) has higher cloud points than the other compositions and that the potency of the compositions of this invention was comparable to the potency of the other compositions.

EXAMPLES XIII through XIX

A series of block copolymers were produced using the reactants and reaction conditions used in Examples I to XII above. In Example XIII, trifluoroacetic acid was used as a catalyst and, in Examples XIV to XIX, pyridinium dodecylbenzene sulfonate was used as a catalyst. In the case of Examples XIV to XIX, the neutralized liquid products contained sodium dodecylbenzene sulfonate produced by the neutralization of the acid salt catalyst. The amount of catalyst employed and the cloud point, viscosity and silicon-bonded ethoxy content of the products of these Examples are shown in Table 3.

TABLE 3

| Example | Catalyst Conc. (%) | Cloud Point (°C) | Product Viscosity (cs at 25°C) | %$OC_2H_5$ |
|---|---|---|---|---|
| XIII* | 0.18 | 39 | 947 | 0.13 |
| XIV(a) | 0.10 | 40 | 868 | 0.15 |
| XV(a) | 0.10 | 40 | 963 | 0.13 |
| XVI | 0.20 | 44 | 903 | 0.15 |
| XVII | 0.30 | 100 | 854 | 0.17 |
| XVIII(b) | 0.40 | 100 | 950 | 0.12 |
| XIX(b) | 0.40 | 100 | 919 | 0.14 |

(a) duplicate runs
(b) duplicate runs

The properties of the polyurethane foams produced from the products of Examples XIII to XIX are shown in Table 4 below.

The data in Table 3 above and in Table 4 below show that the compositions of this invention (the products of Examples XIV to XIX) had higher cloud points and were more potent polyurethane foam stabilizers than the composition of Example XIII.

TABLE 4

| Product of Example | Polyurethane Foam Properties | | | | | |
|---|---|---|---|---|---|---|
| | Test A | | | Test B | | |
| | Foam Rise (in.) | Cells Per (in.) | Air Flow | Foam Rise (in.) | Cells Per (in.) | Air Flow |
| XIII* | 11.9 | 32 | 6.9 | 10.7 | 24 | 6.5 |
| XIV | 12.1 | 34 | 7.8 | 11.6 | 32 | 6.9 |
| XV | 12.3 | 32 | 7.9 | 11.5 | 30 | 7.7 |
| XVI | 12.2 | 34 | 7.2 | 11.3 | 32 | 7.6 |
| XVII | 12.1 | 34 | 8.3 | 11.2 | 30 | 6.7 |
| XVIII | 12.2 | 34 | 7.7 | 11.2 | 28 | 6.5 |
| XIX | 12.1 | 34 | 7.6 | 11.1 | 28 | 5.6 |

In all the above Examples, the reaction mixtures were neutralized after the reaction had gone to the desired extent employing a large excess of sodium bicarbonate. A solid residue was present after neutralization which included the excess sodium bicarbonate. The neutralization involved the conversion of the acid salt catalyst to the corresponding sodium salt. In those cases where the latter salts were at least partially insoluble in the products, the solid residue also included those salts. Some of the salts formed in the neutralization were at least partially soluble in the products and imparted improved properties to the products when present in significant amounts (e.g., the salts markedly raised the cloud points of the products). The neutralization of the reaction mixtures also regenerated the parent amines that had been used to produce the acid salt catalysts.

In the case of relatively volatile amines, the regenerated amines were volatilized from the reaction mixture along with the solvent and, in the case of relatively non-volatile amines, the regenerated amines remained in the product.

What is claimed is:

1. A composition consisting essentially of: (A) a major amount of a water-soluble siloxane-polyoxyalkylene block copolymer consisting essentially of at least one siloxane block represented by the formula:

$$(R_3SiO_{0.5})_a(R_2SiO)_b(RSiO_{1.5})_c$$

and at least one polyoxyalkylene block represented by the average formula:

$$R''(OC_mH_{2m})_nO_{0.5}$$

wherein R represents a monovalent hydrocarbon group, $a$ and $c$ each have a value of at least 0, $b$ has a value of at least 5, $R''$ is hydrogen or R, $m$ has a value of at least 2 and $n$ has a value of at least 5, and (B) a minor amount of an alkali metal salt of an organic sulfonic acid containing from 10 to 35 carbon atoms, said salt being present in the composition in an amount sufficient to raise the cloud point of the block copolymer.

2. A composition as claimed in claim 1 wherein the acid is an alkarylsulfonic acid.

3. A composition as claimed in claim 1 wherein the salt is sodium dodecylbenzene sulfonate.

* * * * *